Jan. 28, 1969 T. W. SEPARA 3,424,641
MEANS FOR SUPPORTING FLOWERS
Original Filed Aug. 26, 1965
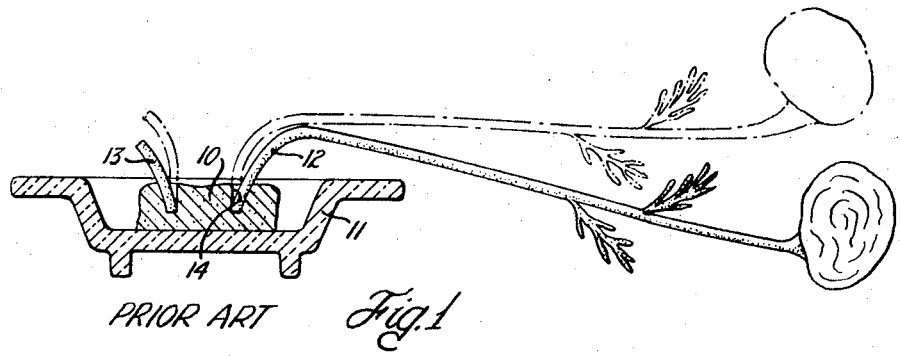
PRIOR ART  Fig.1
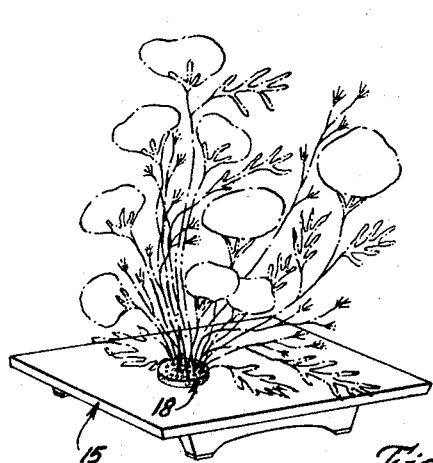
Fig.2
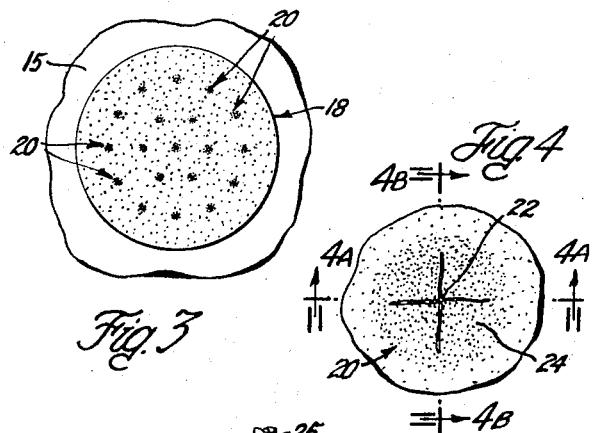
Fig.3  Fig.4
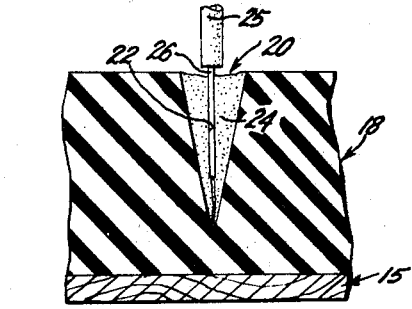
Fig.4A
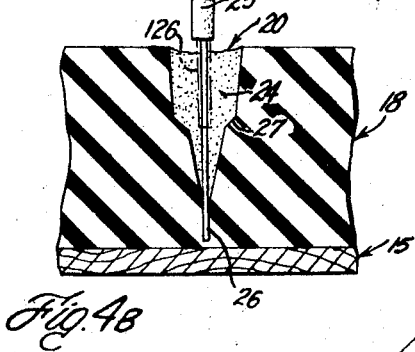
Fig.4B
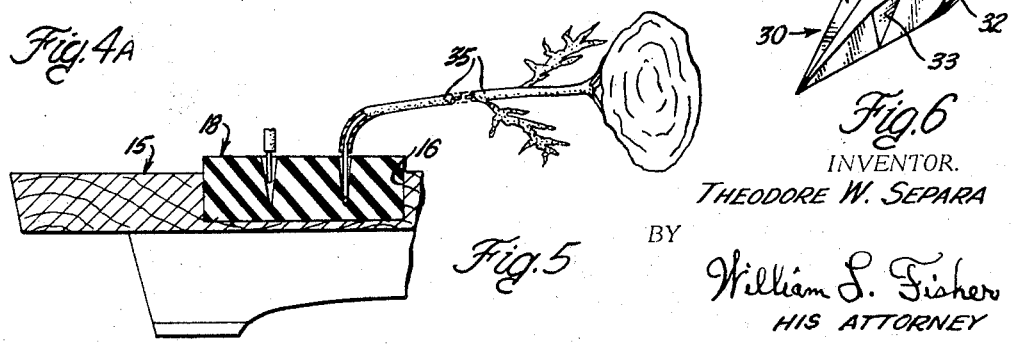
Fig.5
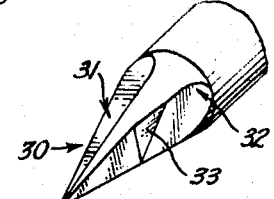
Fig.6
INVENTOR.
THEODORE W. SEPARA
BY *William L. Fisher*
HIS ATTORNEY

United States Patent Office 3,424,641
Patented Jan. 28, 1969

3,424,641
MEANS FOR SUPPORTING FLOWERS
Theodore W. Separa, 320 E. Breckenridge,
Ferndale, Mich. 48220
Continuation of application Ser. No. 482,821, Aug. 26,
1965. This application Apr. 14, 1967, Ser. No. 635,945
U.S. Cl. 161—27                                                           4 Claims
Int. Cl. A41g 1/00; A01n 3/00

ABSTRACT OF THE DISCLOSURE

An elastomeric floral support including at least one aperture surrounded by strained elastomeric material adapted to grip and hold a flower stem when inserted thereinto.

---

This application is a continuation of application Ser. No. 482,821, filed Aug. 26, 1965, now abandoned.

This invention relates to the art of arranging and displaying flowers.

Its principal object is the provision of means for supporting flower stems by which a minimum number of flowers need be utilized and can be supported in the smallest area with minimum interference between flowers and with maximum security and in the neatest arrangement.

Such object of the invention and its advantages will become apparent during the course of the following description taken in conjunction with the accompanying drawings in which:

FIG. 1 is a sectional view of a prior art supporting base for artificial flower stems;

FIG. 2 is a perspective view of an artificial flower arrangement employing a centerpiece type flower arrangement table in combination with a flower stem supporting base embodying the present invention;

FIG. 3 is a plan view of a portion of FIG. 2 showing said supporting base;

FIG. 4 is a plan view of a portion of FIG. 3 showing one of the prepunched apertures in said supporting base;

FIGS. 4A and 4B are vertical sectional views of the structure of FIG. 4 taken, respectively, along the lines 4A—4A and 4B—4B thereof;

FIG. 5 is a fragmentary vertical sectional view similar to FIG. 1 but of the supporting base embodying the present invention; and FIG. 6 is a fragmentary perspective view of means embodying the present invention for punching an aperture in said supporting base.

Referring to the drawings in greater detail, FIG. 1 is denominated "Prior Art" because it illustrates presently used means and method for supporting flower stems. Flower arrangers today employ a block of clay such as that indicated at 10 and place it in a suitable vase or dish, as at 11, and then penetrate the block of clay with flower stems such as at 12 and 13. It must be sizeable because of its weak holding power since a good portion of the lower end of the flower stem must penetrate it in order to be held in place. The block of clay 10 itself is unsightly and oftentimes the flower arranger places flowers around it just to hide it from view. A very fragile flower arrangement is the result which is subject to being disturbed drastically just from moving the dish 11 or from touching or bumping into any of the flowers on the stems 12 or 13. Even without disturbance of the flower arrangement the weight of a flower and stem gradually enlarges the aperture which the stem penetrated in the block of clay 10 so that a trench is formed, as indicated at 14, from elongation of the aperture in the direction of the pull of gravity upon the flower and stem. Repair of the block of clay 10 is difficult as other flower stems are disturbed from fixing one of them and the elongated trench rarely gets back to the shape of the original penetrated aperture. In time the clay dries out and crumbles on its own and when attempts are made to repair it.

The foregoing difficulties are obviated by the present invention which is shown in FIGS. 2–6. In FIG. 2 the artificial flower arrangement centerpiece type table is designated 15 and has a circular depression 16 formed inwardly of the top surface thereof. A supporting base 18 of a hard elastomeric material in cylindrical form and having planar top and bottom faces is embedded in the depression 16 so that the top face thereof is disposed above the top surface of the table 15. The elastomer must have a hardness of 85 or greater Shore durometer to be a hard elastomeric material within the meaning of this term as used herein. The elastomer, as will be further explained, must have elasticity so that it will stretch during puncturing and close over the ruptured center and yet must be both yielding and firm to permit insertion of flower stem wires and to hold them in place. I have found that white rubber compounded with clay and green pigment to produce a green colored rubber supporting base of 90 Shore durometer can be used satisfactorily as a supporting base. The base 18 is made slightly oversize in respect to the size of the depression 16 so that the base is under some radial compression which permits, as will appear, a circle of prepunched apertures to be disposed near the periphery of the base 18. The plan view of FIG. 3 of the base 18 shows a plurality of apertures 20 which are prepunched in the base 18 and radially and circumferentially spaced from each other. One such aperture is disposed in the center of the base 18 and the others in concentric inner and outer rings about the one. Beyond the outer ring of apertures there isn't as much material as there is beyond the inner rings but this is compensated for by the radial compression at the periphery of the base 18 from its being forced into the undersize depression 16.

Each aperture 20 is constructed to have inserted therein a wire for a flower stem and so that force is required to be exerted on the wire to insert it in the aperture. The aperture grips the inserted wire to hold the flower stem in position over the base. To possess these functions the aperture must have sufficient length within the base to provide an upper part which has more yieldability and a lower part which has more holding power for flower stems. As shown in FIGS. 4, 4A and 4B each aperture 20 has a center 22 in which the bond of the elastometric material is ruptured and a section 24 surrounding the 22 in which the bond of the elastometric material is strained. The center 22 is substantially closed over by the material of the surrounding section 24. The strained bond section 24 decreases in cross section with the depth of the aperture 20 and its holding power on the flower stem wire increases with its depth. The upper part of the strained bond section 24 is larger in cross section to yield during insertion of the larger diameter flower stem wires while the lower part is smaller in cross section to yield also but not as much and more importantly to more firmly grip and hold both the larger and the smaller diameter wires. In the case of very small diameter wires these may sometimes be inserted beyond the depth of the aperture 20 as will be further explained. As shown in FIG. 4A the strained bond section 24 is uniformly equilaterally triangular in one cross section. The strained bond section 24 is also nonuniformily equilaterally triangular in another cross section as shown in FIG. 4B. The two cross sections shown are at right angles to each other. By thus forming each aperture 20 its upper part has more yieldability and its lower part more holding power for flower stems and the resistance to insertion of flower stem wires increases with the diameter of the wire and the depth of insertion. Each flower stem in accordance with the present invention has its covering 25 removed to expose at its lower end the flower stem wire 26. The wire 26 is forced into the center 22 with a pair of pliers to the maximum depth to which it can be inserted without bending the wire or exerting excessive force. The harder the wire 26 is to insert in the aperture 20 the harder it is to remove and the more firmly it is gripped by the aperture. For commercial purposes for sale to flower arrangers the wire must be reasonably easy to insert but must nevertheless require force to be exerted on it to insert it. As shown in FIG. 4B the thinner diamter wire 26 is deeper in an aperture 20 than the thicker diameter wire 126. The aperture 20 is designed to accommodate the largest diameter flower stem wire used down to the very smallest. The very small diameter wires can be inserted beyond the depth of the aperture 20 into nonprepunched material of the base 18 which grips them even tighter than the lower part of the aperture 20 and insures that they will be held firmly whereas the larger diameter wire cannot be inserted beyond the depth of the aperture 20 and yet are held equally firm. The wires are held firm enough that the flowers will not be disturbed from bumping them or from washing them, for example, but they will rotate in the aperture 20 about their own axes when a small amount of force is applied to them to deliberately change their positions. In FIG. 4B the upper portions of the strained bond sections are abruptly larger in area than and separated from the smaller area portions by shoulders 27 which provide more "give" during insertion for the larger diameter wires. More resistance is encountered in forming the strained bond section as shown in FIG. 4B so that for half of the aperture the strained bond section is formed as shown in FIG. 4A. This results from the means shown in FIG. 6 for punching one of the apertures 20 which comprises an elongated member 30 of cylindrical cross section except for its entering end. The entering end is uniformily equilaterally triangular in one cross section which is indicated at 31 and nonuniformly equilaterally triangular in another cross section 32. The two cross sections 31 and 32 are at right angles to each other so that half of the entering end of the member 30 has the form of the cross section 31 and the other half the form of the cross section 32. Shoulders 33 are formed on the cross section 32 which formed the previously described shoulders 27 in the strained bond section 24. The shoulders 33 are tapered as shown in FIG. 6 to prevent tearing of the elastomer during puncturing. The shoulders 33 are oppositely formed on the sections 32 to balance the action of the punch 30. The plurality of apertures 20 in the base 18 are formed simultaneously by a corresponding number of punches 30 mounted in an arbor press. The supporting base 18 is set beneath the plurality of punches 30 which are drawn down with force to penetrate the base 18 until the apertures 20 terminate short of the bottom face of the base. In this action of puncturing the elastomer to form the apertures 20 the bond of the elastomeric material is ruptured in the center from breaking during stretching while the section surrounding the center is strained from overstretching. In FIG. 5 is shown a flower stem 35 supported in an extremely overhanging position as shown by virtue of the holding power of the base 18 which position could not be attained by prior art means and method. The combination shown in FIG. 5 is best made with a supporting base of one-half inch in depth which is the minimum possible depth to accommodate an aperture with the functions described for the aperture 20 and at the same time is the maximum possible depth as the top face of the supporting base should be as close as possible to the top surface of the table 15. By providing a base 18 as described and pre-punching the apertures 20 and forcefully inserting wires for flower stems therein the neatest and most compact arrangement for supporting flower stems is attained. The minimum number of flowers need be utilized because the base 18 is attractive and pleasing to the eye and no flowers need be used in an attempt to hide it. The greatest security is possible because of the holding power of the apertures 20 on the bared wires is so great and the combination of the two are so small the base 18 can be minimum in size and thus support any given number of flowers in the smallest area.

What is claimed is:

1. Means for supporting artificial flowers via their wire flower stems comprising a solid rubber supporting base of at least 85 Shore durometer having a prepunched aperture therein defined by intersecting slits, the aperture constructed to have inserted therein a flower stem wire of one of said artificial flowers and so that force sufficient to require a tool is required to be exerted on the wire to insert it in said aperture, the aperture constructed to grip the inserted wire to hold said flower via its flower stem in position over said base, said aperture having a center in which the bond of the rubber is ruptured and a section surrounding said center in which the bond of the rubber is strained, the center being substantially closed over by the rubber of said surrounding section, whereby a maximum number of such flowers can be held in a given minimum area with a maximum holding force on each.

2. Means for supporting artificial flowers via their flower stems comprising, in combination, a solid hard rubber supporting base having a prepunched aperture therein, the aperture constructed to have inserted therein a flower stem wire of one of said artificial flowers and so that force sufficient to require a tool is necessary to be exerted on the wire to insert it fully in said aperture, the aperture constructed to grip the inserted wire to hold said flower via its flower stem in position over said base, said aperture having a center in which the bond of the rubber is lengthwise ruptured and which center is substantially closed over by the rubber surrounding said center, and a decorative flower holder having a planar top surface, a depression in the holder inwardly of the top surface thereof, the supporting base having planar top and bottom faces and said aperture extending thereinto from the top face but terminating short of the bottom face thereof, said base having a depth of the order of ½ inch and embedded in said depression so that it is under radial compression and the top face thereof is disposed above but in close proximity to said holder top surface, said holder portion provided with said depression having a depth overall of the order of the base.

3. Means for supporting artificial flowers via their flower stems comprising, in combination, a solid hard rubber supportng base having a prepunched aperture therein, the aperture constructed to have inserted therein a flower stem wire of one of said artificial flowers and so that force sufficient to require a tool is necessary to be exerted on the wire to insert it fully in said aperture, the aperture constructed to grip the inserted wire to hold said flower via its flower stem in position over said base, said aperture having a center in which the bond of the rubber is lengthwise ruptured and which center is substantially closed over by the rubber surrounding said center, said aperture having at least one slit crosswise of its length, and a decorative flower holder having a planar top surface, a depression in the holder inwardly of the top surface thereof, the supporting base having planar top and bottom faces and said aperture extending thereinto from the top face but terminating short of the bottom face thereof, said base embedded in said depression so that the top face thereof is disposed above but in close proximity to said holder top surface.

4. Means as claimed in claim 3 in which the supporting base has a plurality of said apertures therein, said apertures being radially and circumferentially spaced from each other.

References Cited

UNITED STATES PATENTS 2,951,278  9/1960  Hoffman _____ 161—154 XR

FOREIGN PATENTS 698,531  10/1953  Great Britain.
719,344  12/1954  Great Britain.

ROBERT F. BURNETT, *Primary Examiner.*

W. POWELL, *Assistant Examiner.*

U.S. Cl. X.R.

161—31; 248—27.8; 47—41.12